Aug. 3, 1965          C. L. McGHEE          3,198,066
OUTDOOR ADVERTISING DEVICE INCLUDING PROJECTION MEANS
Filed March 1, 1962

INVENTOR.
Clarence L. McGhee
BY
ATTORNEY

United States Patent Office 3,198,066
Patented Aug. 3, 1965

3,198,066
OUTDOOR ADVERTISING DEVICE INCLUDING PROJECTION MEANS
Clarence L. McGhee, 4420 Kushla, Dallas, Tex.
Filed Mar. 1, 1962, Ser. No. 176,701
1 Claim. (Cl. 88—24)

This invention relates to outdoor advertising devices, and it has particular reference to billboard display signs.

The principal object of the invention resides in the provision of a billboard embodying automatic features adapting the same to the display of a variety of different advertising message during the nighttime while serving as a fixed advertising display during daylight hours whereby a plurality of advertisers can publicize their wares and services.

An object of the invention is that of providing an automatically actuated structure whereby a billboard of conventional appearance, bearing fixed advertising indicia, can be transformed after dark to a projection screen on which a variety of advertisements may be displayed by a slide projector focussed thereon and operated by an electrical circuit.

A further object of the invention resides in the provision of a motor actuated mechanism by which the transformation of the billboard panel can be accomplished through the transition from daylight to darkness, or vice versa, and by which a slide projector can be animated to display nighttime advertisements.

Generally, the invention makes possible the provision of means whereby several advertisers can display their messages during different predetermined time intervals on a single panel between dusk and dawn while the same panel bears a fixed advertisement during the day.

While the foregoing objects are important, other lesser objects will become apparent as the invention is described more in detail and with reference to the annexed drawing in which.

Figure 1:
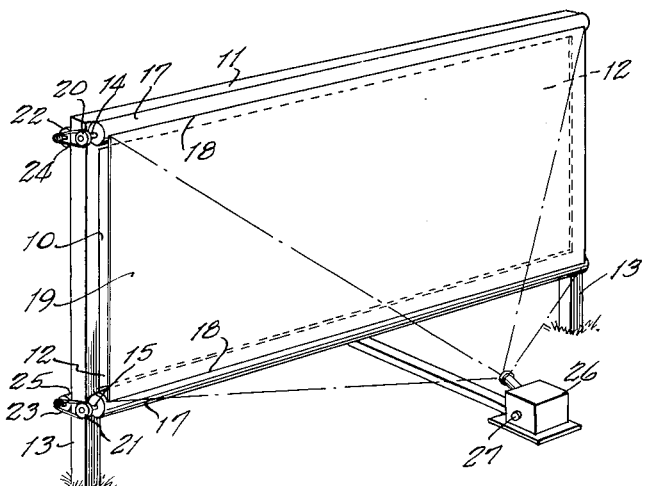
FIGURE 1 is a perspective illustration of a billboard embodying the invention, showing the projector screen in position and a slide projector focussed thereon.
Figure 2:
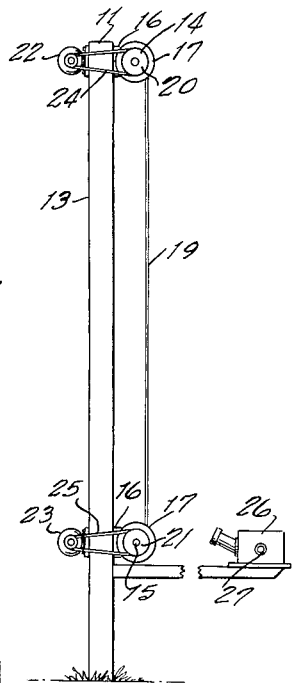
FIGURE 2 is an end elevational view thereof illustrating the upper and lower cylindrical housings for the screen, and showing the projector.
Figure 3:
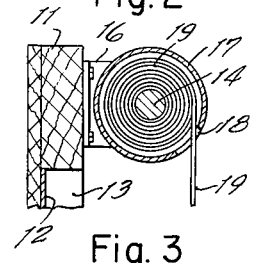
FIGURE 3 is a fragmentary transverse sectional view of the upper frame member of the billboard, the upper screen roller and housing.

As depicted in FIGURES 1, 2 and 3 of the drawing, the invention comprises a panel 10, of suitable dimensions, supported in a frame comprising top, bottom and end members 11, 12 and 13, respectively. The end members 13 may extend below the frame and serve to support the structure when installed in an outdoor area, such as along public highways, and the like. The panel 10 is adapted for the display of a poster or painted advertisement.

Arranged along the front of the top and bottom members 11 and 12 of the frame are shafts or rollers 14 and 15 whose ends are rotatively supported in brackets 16 secured to the frame members 11 and 12, in the manner shown in FIGURE 3. Each of the rollers 14 and 15 concentrically enclosed within a tubular housing 17 whose ends are secured to the brackets 16 in fixed position. Each housing 17 has a longitudinal slot 18 formed in one side substantially offset with respect to the longitudinal axis of the housing 17, as illustrated in FIGURE 3, and provides an opening through which a flexible screen 19 can pass when reeled upon the rollers 14 and 15.

Attached to one end of each of the rollers 14 and 15 is a pulley or sprocket 20 or 21 which is rotated by a motor 22 or 23 mounted on the frame members 13 opposite to the housings 17 by belts or sprocket chains 24 or 25, as illustrated in FIGURES 1 and 2. Each of the motors 22 and 23 are connected to an electrical source and provided with a light actuated switch (not shown) whereby the motors are capable of alternate operation and in opposite directions, so that the screen 19 can be alternately reeled from one roller to the other automatically when the respective motors are energized, as through the medium of a photoelectric cell (not shown).

The invention is adapted to be installed on existing billboards, of the type shown in FIGURES 1 and 2, and the screen 19 may be of such length as to provide space for advertising indicia imprinted thereon for fixed day time display, while also providing a blank portion to be exposed at night for the projection of slides by a projector 26 which may be supported in any suitable manner before the screen 19, as illustrated in FIGURES 1 and 2, and actuated through a photo-electric switch 27. During daylight hours the portion of the screen 19 bearing the permanent indicia can be exposed and reeled into one of the housings 17 at night to expose the blank portion of the screen.

It is obvious, of course, that a number of signs may be painted or imprinted on the screen 19, which may be of considerable length so that the motors 22 and 23 can be intermittently operated in one direction to expose a portion of the screen at predetermined intervals, and in such event, the motors could be actuated through a timer switch.

Figure 4:
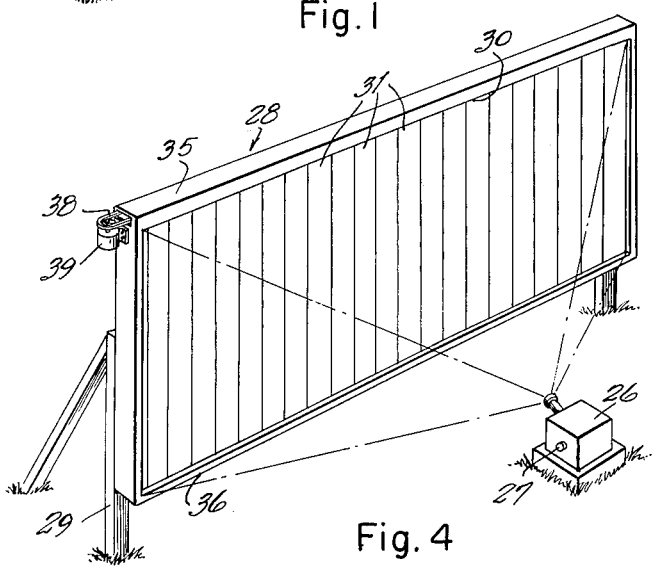
FIGURE 4 is a perspective illustration of a modified structure in which the panel is comprised of a plurality of vertically aligned pivotal units, and showing a projector focussed thereon.
Figure 6:
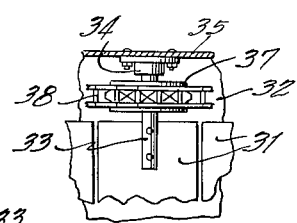
Figure 5:
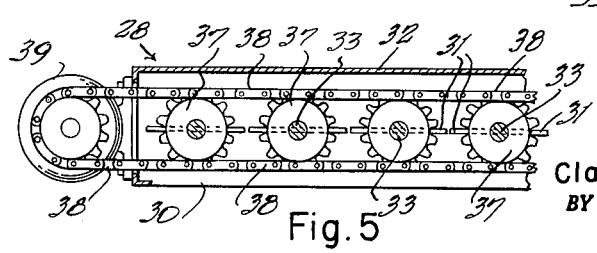
FIGURE 5 is a fragmentary plan view of the motor and chain driven sprockets for the pivotal panel units, the top of the billboard being shown cut away, and FIGURE 6 fragmentarily illustrates the upper driven end of one of the pivotal panel units showing a chain and driven sprocket.

In the modified structure, shown in FIGURES 4, 5 and 6, a rectangular housing 28 is provided and which is vertically supported on posts 29 anchored in the earth, or other suitable arrangement. The front of the housing has a framed opening 30.

A series of slats 31 is mounted in the housing 28 intermediate the rear wall 32 thereof and the front opening 30, and each slat 31 has a spindle 33 attached to its upper and lower ends by which it is capable of rotation. The spindles 33 are journalled in bearings 3 secured to the top and bottom walls 35 and 36 of the housing 28, as shown in FIGURE 6. On each of the upper spindles 33 is a sprocket 37 whose teeth are engaged by a sprocket chain 38 driven by a reversible motor 39 attached to one end of the housing 28, as shown in FIGURE 5.

The slats 31 are capable of rotation 180 degrees so that each side thereof is alternately facing the opening 30 when the motor 39 is operated at intervals alternately in opposite rotation. The slats 31 when aligned so that their planar surfaces are in the same planes, as shown in FIGURES 4 and 5, they collectively form a solid panel so that when one side of each of the slats 31 are displayed a fixed sign can be painted thereon while a blank panel is displayed when the slats are collectively reversed, thus providing a projection screen on which a series of slides can be projected, as by the projector 26, in the manner illustrated in FIGURE 4.

The projector 26 may obviously be equipped with rotary or linear slides, and timing switch by which the slides can be automatically changed at predetermined intervals. The reversible motor 39, for rotating the reversible slats 31, which collectively form a reversible panel, and the projector are turned on and off by a light-actuated switch, such as the photo-electric cell 27.

The invention, although described in great detail, may be modified or changed, by persons skilled in the art, without departing from the spirit and intent thereof or from the scope of the appended claim.

What is claimed is:

In an advertising billboard adapted for both permanent and light projected indicia, the said billboard having a frame having top, bottom and end members, a roller pivotally supported at each end along each of said top and bottom members, an electric motor mounted on the said frame for driving each of said rollers, and intermittently rotating the same a predetermined number of revolutions, a flexible screen of indeterminate length reeled on said rollers and capable of having a portion thereof exposed in a vertical plane between said rollers at predetermined intervals, certain of said exposed portions bearing advertising indicia imprinted thereon, and other of said exposed portions being blank, a projector associated with said billboard and adapted to project an image on said blank portions when exposed by the rotation of said rollers, timing means for actuating each of said motors for predetermined intervals, and light actuated means for energizing said projector.

References Cited by the Examiner

UNITED STATES PATENTS

| 1,252,248 | 1/18 | Davis et al. | 88—24 |
| 2,050,826 | 8/36 | Bloxsom | 88—28.9 X |
| 2,796,802 | 6/57 | De Felice | 88—28.9 X |

FOREIGN PATENTS

| 657,062 | 9/51 | Great Britain. |
| 269,846 | 11/50 | Switzerland. |

JULIA E. COINER, *Primary Examiner.*